UNITED STATES PATENT OFFICE.

R. A. TILGHMAN, OF PHILADELPHIA, PENNSYLVANIA.

IMPROVEMENT IN DECOMPOSING POTASH-FELDSPAR FOR OBTAINING CERTAIN SALTS.

Specification forming part of Letters Patent No. 5,384, dated December 4, 1847.

*To all whom it may concern:*

Be it known that I, RICHARD ALBERT TILGHMAN, of the city of Philadelphia, in the State of Pennsylvania, have invented a new and useful improvement called "An Improvement in Extracting Potash from Feldspars," of which the following is a full and exact description.

My invention consists in a method of decomposing feldspars containing potash by heating them with a sulphate or muriate of another base, by which means are produced a sulphate or muriate of potash and a silicate of the other base employed. The feldspars best for the purpose are those containing the largest quantity of potash, and the proportions of materials directed to be used in the processes hereinafter described are calculated for a feldspar containing sixteen per cent. of potash.

I decompose feldspar for the production of sulphate of potash by heating together at or above redness a potash-feldspar, lime, or its carbonate, and the sulphate of either lime, baryta, or strontia, and afterward lixiviating the mixture with water. I have the materials ground to fine powder and mix them intimately in the proportion of two parts, by weight, of feldspar, one part of lime, or an equivalent quantity of carbonate of lime, and one part of sulphate of lime, which I prefer to the other sulphates. I place the mixture upon the hearth of a reverberatory furnace, and heat it to a bright redness for about eight hours, turning the charge from time to time, so that all parts may receive equal heat. Although the formation of sulphate of potash is most rapid at a high temperature, yet I do not let the heat rise high enough to cause the fusion or agglutination of the mass, as the subsequent extraction of the salt by water is thereby rendered more difficult. The presence of a deoxidizing atmosphere in the furnace being injurious to the formation of the sulphate of potash, I admit through suitable openings above the level of the fire a sufficient quantity of air into the gases arising from the fuel to preserve the atmosphere in an oxidizing state. When all parts of the charge have remained at a high red heat for from eight to ten hours, I withdraw the charge from the furnace and lixiviate it with hot water repeatedly, as some of the salt adheres obstinately to the sulphate of lime. The solution of sulphate of potash is then evaporated, the sulphate of lime which deposits during the evaporation being continually removed. When the sulphate of baryta or strontia is used in place of the sulphate of lime the same process is to be pursued; but the extraction of the sulphate of potash by water is more easy, owing to the less solubility of the sulphates of baryta and strontia.

The lime may be dispensed with in the above process if the quantity of sulphate of lime or other sulphate used be increased in the proportion of three parts of sulphate added for one part of lime omitted, and the process conducted as above described; but I prefer the use of lime, as above stated.

When a cheap and abundant supply of sulphurous-acid gas can be obtained, as from the roasting of sulphurous ores, the use of the sulphate of lime or other sulphate in the mixture may be dispensed with by doubling the quantity of lime or of carbonate of lime before prescribed, and exposing the charge while at a red heat in the furnace to a current of sulphurous-acid gas and air with frequent stirring. Sulphate of lime is thus formed during the process, and the formation of sulphate of potash takes place, as in the former case.

I decompose feldspar for the production of muriate of potash by heating together a potash-feldspar, and the muriate of either soda, lime, or iron at a temperature above the fusing-point of the muriate employed. I prefer using muriate of soda or common salt, which I mix with an equal weight of finely-ground feldspar. The mixture is well dried and introduced into a horizontal iron cylinder with an opening only at one end, which is closed with an iron door or cover and luted tight. For the escape of any gas that might tend to burst the cylinder I have a small hole through the upper part of the door, which is closed at pleasure by a loosely-fitting plug. The cylinder is covered on the outside with fire-brick to protect the iron from the action of the fire. The cylinder and its contents are to be heated to bright redness for about six hours. The heat should be above the fusing-point of the muriate employed; but I prefer to keep it below the point at which the feldspar would melt, as the charge would then be more difficult to remove from the cylinder. The cover is now taken off, and charge raked out as quickly as possible into an iron pot, which is immediately covered and kept closed until the mass is cool. The soluble salts are to be extracted from the mass by water, and the muriate of potash separated from the other salt by evaporation and crystallization in the usual manner.

The same process is pursued when the muriate of lime or iron is employed.

I claim as of my invention—

1. The method of decomposing potash-feldspar for the production of sulphate of potash by heating at or above redness a mixture of a potash-feldspar and the sulphate of either lime, baryta, or strontia.

2. The method of decomposing potash-feldspar for the production of muriate of potash by heating together a potash-feldspar and the muriate of either soda, lime, or iron at a temperature above the melting-point of the muriate employed.

In testimony whereof I, the said RICHARD ALBERT TILGHMAN, hereto subscribe my name, in the presence of the witnesses whose names are hereto subscribed, on the 13th day of September, A. D. 1847.

RICHARD ALBERT TILGHMAN.

In presence of—
JOSEPH MARQUETTE,
WILLIAM EWING.